US006950763B1

(12) United States Patent
Bechhoefer

(10) Patent No.: US 6,950,763 B1
(45) Date of Patent: Sep. 27, 2005

(54) OPTIMAL SHAFT BALANCE USING INTEGER PROGRAMMING TO HANDLE DISCRETE ADJUSTMENT

(75) Inventor: Eric Robert Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 118 days.

(21) Appl. No.: 10/306,510

(22) Filed: Nov. 27, 2002

(51) Int. Cl.[7] .............................................. G01H 17/00
(52) U.S. Cl. ...................... 702/56; 702/33; 702/119; 73/462; 73/468; 73/570; 73/579; 73/66
(58) Field of Search .......................... 702/56, 179–183, 702/33–34, 77, 111, 113, 119; 73/462, 468, 73/11.04, 11.07, 570, 579, 66

(56) References Cited

U.S. PATENT DOCUMENTS

| | | | |
|---|---|---|---|
| 3,802,273 A | 4/1974 | Helmuth et al. | |
| 5,214,585 A | 5/1993 | Ehrich | |
| 5,502,650 A * | 3/1996 | Naruse et al. | 700/279 |
| 5,544,073 A * | 8/1996 | Piety et al. | 700/279 |
| 5,602,759 A * | 2/1997 | Harashima et al. | 702/56 |
| 5,724,271 A | 3/1998 | Bankert et al. | |
| 6,236,934 B1 * | 5/2001 | Dyer et al. | 701/124 |
| 6,415,206 B1 | 7/2002 | Ventres | |
| 6,651,012 B1 * | 11/2003 | Bechhoefer | 702/34 |
| 6,711,523 B2 * | 3/2004 | Bechhoefer et al. | 702/181 |

FOREIGN PATENT DOCUMENTS

| | | |
|---|---|---|
| DE | 41 43 543 C2 | 3/1998 |
| EP | 1 228 960 A1 | 8/2002 |
| GB | 2 159 484 A | 12/1985 |
| GB | 2 159 952 A | 12/1985 |

OTHER PUBLICATIONS

Edward S. Zorzi et al.; "*Modern Rotor Balancing-Emerging Technologies*"; VIBRATION, Mechanical Engineering; pp. 25-31, (Dec. 9, 1985).
J. C. Austrow; "*An Optimum Balance Weight Search Algorithm*"; Transactions of the ASME, vol. 116; pp. 678-681, (Jul. 1994).
Foiles, et al.; "*Review: Rotor balancing*"; Shock and Vibration, Department of Mechanical, Aerospace & Nuclear Engineering, University of Virginia, Thorton Hall, Mc-Cormick Road, Charlottesville, VA, USA 5; pp. 325-336 (1998).

* cited by examiner

*Primary Examiner*—John Barlow
*Assistant Examiner*—Hien Vo
(74) *Attorney, Agent, or Firm*—Choate, Hall & Stewart LLP

(57) ABSTRACT

Determining a shaft balance adjustment includes measuring an initial vibration of the shaft, determining if the initial vibration is greater than a predetermined value, and, if the initial vibration is greater than the predetermined value, determining an adjustment by choosing a best adjustment for each possible location for adjustments. Choosing the best adjustment may include choosing an adjustment that causes a lower amount of vibration than adjustments not chosen. Measuring an initial vibration may include using an accelerometer. Measuring an initial vibration may include using conditioning electronics in connection with the accelerometer. The predetermined value may be 0.01 ips.

22 Claims, 4 Drawing Sheets

OPTIMAL SHAFT BALANCE USING INTEGER PROGRAMMING TO HANDLE DISCRETE ADJUSTMENT

BACKGROUND OF THE INVENTION

1. Technical Field

This application relates to the field of adjusting mechanical systems, and more particularly to the field of measuring vibration and using the measurement to provide suggested adjustments to reduce the vibration.

2. Description of Related Art

Mechanical system often contain a plurality of shafts that rotate at relatively high speeds. In some cases, imbalance of the shaft may cause unacceptable vibrations. For example, in a helicopter system with many high speed shafts, a vibration of two ips (inches per second) renders the helicopter unflyable. Even shaft vibration as slow as ½ ips may make flying in a helicopter uncomfortable. Thus, it is desirable to be able to eliminate or at least reduce vibrations caused by shaft imbalance.

In some cases, shafts are provided with a provision for inserting weights at the end thereof in the form of bolts and/or washers. There may be a number of possible bolts of different fixed weights such as one grams, two grams etc. and, similarly, there may be a number of possible washers of different fixed weights such as ¼ gram, ½ gram, etc. Adjustments may be made by placing some combination of bolts and/or washers into the adjusting positions at the end of the shaft. However, it is usually difficult to determine manually how much needs to be added to each location. Using trial and error is impractical because, in the first place, determining an effective adjustment using trial and error requires restarting the machine and remeasuring the vibrations each time an adjustment is made and, in the second place, the number the combinations may make trial error prohibitive. For example, if there is six possible bolt hole locations and five possible weights (three bolts and/or two washers) that could go in each location, then the number of combinations we are balancing is approximately 47045881. The problem expands worse than exponential. For 12 possible bolt hole locations and similar adjustments, the total number of combination is now $2.2133 \times 10^{15}$.

In some instances, it may be possible to use a computer to determine the appropriate adjustment for balancing the shaft. However, even if the vibrations are measured by the computer, it may not be possible to provide an exact counteracting weight since the adjusting weights are discrete amounts provided at discrete locations whereas the vibration could be any amount at any location on the shaft. In addition, a computational trial and error method may be prohibitive with a computer because, just as with the manual trial error method, the number of combinations may so large that it would be prohibitive to have a computer do calculations for all the possible combinations.

Accordingly, it is be desirable to provide a technique for determining an adjustment to balance a rotating shaft.

SUMMARY OF THE INVENTION

According to the present invention, determining a balance adjustment for a mechanical component includes measuring an initial vibration of the component, determining if the initial vibration is greater than a predetermined value, and, if the initial vibration is greater than the predetermined value, determining an adjustment by choosing a best adjustment for each possible location for adjustments. Choosing the best adjustment may include choosing an adjustment that causes a lower amount of vibration than adjustments not chosen. Choosing the best adjustment may include choosing an adjustment that reduces the vibration to an acceptable level and minimizes the number of weights that are added. Measuring an initial vibration may include using an accelerometer. Measuring an initial vibration may include using conditioning electronics in connection with the accelerometer. The predetermined value may be 0.01 ips. Determining an adjustment may also include, following measuring an initial vibration of the component, indicating a mechanical fault in response to the initial vibration containing a significant frequency component other than a frequency component at a rotation rate of the component. A significant component may correspond to a magnitude of at least 25% of a magnitude of the frequency component at the rotation rate of the component. Determining an adjustment may include setting an initial proposed adjustment, setting a first pointer to point to a first location, setting a second pointer to point to a first weight, iterating the second pointer through each of the weights and updating the proposed adjustment when a new weight causes a decrease in calculated vibrations, and iterating the first pointer through each of the locations and performing the iteration of the second pointer at each location. Determining an adjustment may include setting an initial proposed adjustment, setting a first pointer to point to a first weight, setting a second pointer to point to a first location, iterating the second pointer through each of the location and updating the proposed adjustment when a new weight causes a decrease in calculated vibrations, and iterating the first pointer through each of the weights and performing the iteration of the second pointer for each weight. The component may be a shaft and all of the possible locations for an adjustment may be symmetrical about a circumference at an end of the shaft. All of the possible locations for an adjustment may be at a constant radius about a circumference at an end of the shaft. A first set of the possible locations for an adjustment may be at a first radius about a circumference at an end of the shaft and a second set of the possible locations for an adjustment may be at a second radius about a circumference at an end of the shaft. All of the possible locations for an adjustment may be non-symmetrical about a circumference at an end of the shaft.

According further to the present invention, computer software that determines a balance adjustment for a mechanical component includes executable code that measures an initial vibration of the component, executable code that determines if the initial vibration is greater than a predetermined value, and executable code that, if the initial vibration is greater than the predetermined value, determines an adjustment by choosing a best adjustment for each possible location for adjustments. The software may further include executable code that chooses an adjustment that causes a lower amount of vibration than adjustments not chosen. The software may further include executable code that chooses an adjustment that causes an amount of vibration below a predetermined amount and minimizes a number of new weights that are added. The software may further include executable code that, following measuring an initial vibration of the shaft, indicates a mechanical fault in response to the initial vibration containing a significant frequency component other than a frequency component at a rotation rate of the component. A significant component may correspond to a magnitude of at least 25% of a magnitude of the frequency component at the rotation rate of the component. The software may further include executable code that sets an initial proposed adjustment, executable code that sets a first pointer to point to a first location, executable code that sets a second pointer to point to a first weight, executable code that iterates the second pointer through each of the weights and updates the proposed adjustment when a new weight causes a decrease in calculated vibrations, and executable code that iterates the first pointer through each of the locations and performs the iteration of the second pointer at each location. The software may further include executable code that sets an initial proposed adjustment, executable code that sets a first pointer to point to a first weight, executable code that sets a second pointer to point to a first location, executable code that iterates the second pointer through each of the location and updates the proposed adjustment when a new weight causes a decrease in calculated vibrations, and executable code that iterates the first pointer through each of the weights and performs the iteration of the second pointer for each weight.

According further to the present invention, a system that determines a balance adjustment for a mechanical component includes means for measuring an initial vibration of the component, means for determining if the initial vibration is greater than a predetermined value and means for determining an adjustment by choosing a best adjustment for each possible location for adjustments if the initial vibration is greater than the predetermined value. The means for measuring may include an accelerometer and/or conditioning electronics coupled to the accelerometer.

DETAILED DESCRIPTION OF VARIOUS EMBODIMENTS

Figure 1:
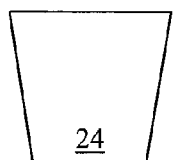
FIG. 1 is a schematic diagram showing a shaft, a processor, an accelerometer, a tachometer, and a display according to the system described herein.

Referring to FIG. 1, a diagram 20 illustrates a system for measuring and suggesting adjustments to correct vibrations of a rotating shaft 22. The shaft 22 may be part of a larger system such as a mechanical system for a helicopter or another system that includes rotating shafts.

The shaft 22 may be supported by one or more bearings such as a pillow bearing 24 shown in FIG. 1. Vibration of the shaft 22 may be measured by an accelerometer 26 mounted on the bearing 24. The accelerometer 26 may measure vibration of the shaft 22 (in g's) and provide an electronic output signal proportional to the vibrations experienced by the accelerometer 26. The electronic output signal of the accelerometer 26 may be provided to optional signal conditioning electronics 28 that process/condition the electronic signal and perhaps even digitize the signal. The output of the conditioning electronics 28 may be provided to a processor 32 which receives the signal from the accelerometer 26 and conditioning electronics 28 and provides processing as described in more detail below. In some embodiments, the conditioning electronics may not be used and, instead, the output of the accelerometer 26 may be provided directly to the processor 32. In some embodiments, the conditioning electronics 28 may be integrated with the accelerometer 26.

The system 20 may also include a tachometer 34 that measures the rotational speed and phase of the shaft 22. In an embodiment disclosed herein, the tachometer 34 operates by sensing a reflector 36 mounted on the shaft 22. Thus, each time the tachometer 34 senses the reflector 36, it outputs an electrical signal. The tachometer 34 is coupled to the processor 32 which processes the signal from the tachometer 34 and the signal from the accelerometer 26 and conditioning electronics 28 in a manner discussed in more detail below.

The processor 32 represents any conventional, commercially available processor or any other processor capable of providing the functionality described herein. For example, the processor 32 may be a Dell personal computer. The processor 32 may be coupled to a conventional monitor 38 and a conventional keyboard 42 in order to provide output and input capability. A user may enter commands and data via the keyboard 42 and view the results of processing on the processor 32 using the monitor 38. In other embodiments, other appropriate input and output mechanisms may be used. The processor 32, keyboard 42 (or other input device), monitor 38 (or other output device), and other parts of the system 20 may all be part of a separate diagnostic system, part of the machinery that includes the shaft 22 (e.g., a helicopter), part of a display and input of a helicopter control and display unit (CDU), or some combination thereof.

Figure 2A:
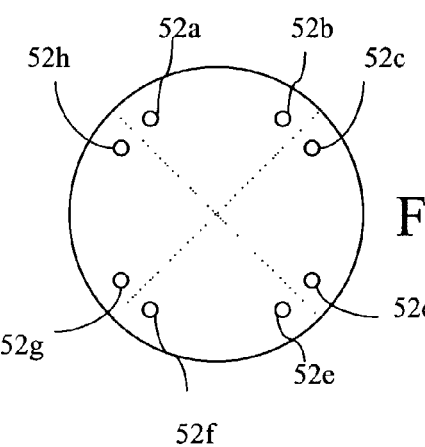
FIGS. 2A, 2B, and 2C are diagrams showing various bolt hole locations used for balancing a shaft.
Figure 2B:
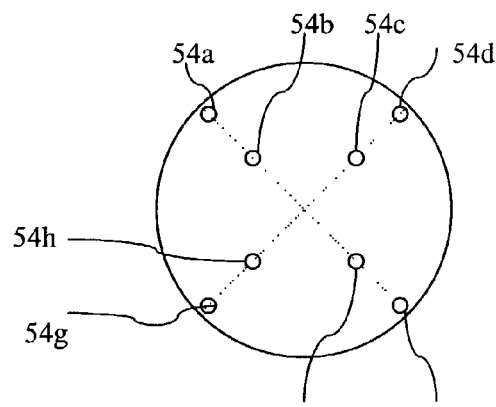
Figure 2C:
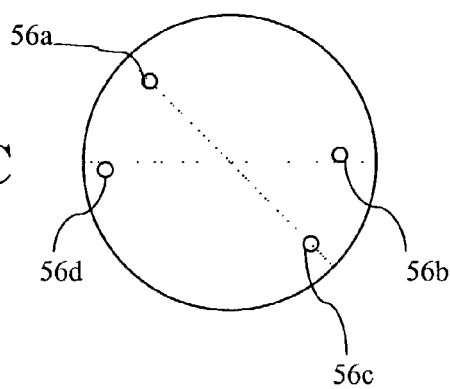

In operations, the system 20 uses the accelerometer 26, the conditioning electronics 28, and the tachometer 34 to provide signals to the process 32 which senses the phase and magnitude of vibration of the shaft 22. The processor 32 then computes an appropriate adjustment for the shaft 22 to reduce the vibration thereof. The adjustments to the shaft 22 may be in the form of providing bolts having different weights and/or providing washers with the bolts that also have different weight. This is described in more detail below. The user reads the proposed adjustments (e.g., on the monitor 38 and/or a CDU). The user stops the shaft 22 from rotating, makes the proposed adjustments, and then remeasures the vibrations, which should be an acceptable amount after the proposed adjustments FIGS. 2A, 2B, and 2C show different configurations for the end of the shaft 22. FIG. 2A shows a plurality of bolt locations, 52$a$–52$h$ provided at the end of the shaft 22. Each of the locations 52$a$–52$h$ is an insert point for a bolt and/or a washer that may be used to alter (and reduce) vibrations of the shaft 22. All of the locations 52$a$–52$h$ in FIG. 2A are at a constant radius from the center of the end of the shaft 22.

FIG. 2B shows another possible configuration for the end of the shaft 22. A first set of locations 54$a$–54$d$ are at a first radius from the center of the shaft 22 while a second set of locations 54$e$–54$h$ are a second radius from the center of the end of the shaft 22. Note, however, that the configurations of FIG. 2A and FIG. 2B are both symmetrical.

Referring to FIG. 2C, a non-symmetrical configuration is illustrated where a plurality of bolt hole locations 56$a$–56$d$ are distributed in a non-symmetrical manner about the end of the shaft 22. Note that other configurations and distributions of bolt hole locations other than those shown in FIGS. 2A, 2B and 2C may be used.

In operation, the processor 32 senses the vibration of the shaft 22 and computes which weights should be inserted in specific bolt hole locations at the end of the shaft 22. Different bolts having different weights in combination with washers of different weights may be used to provide a number of possible weights that may be added to the locations.

Figure 3:
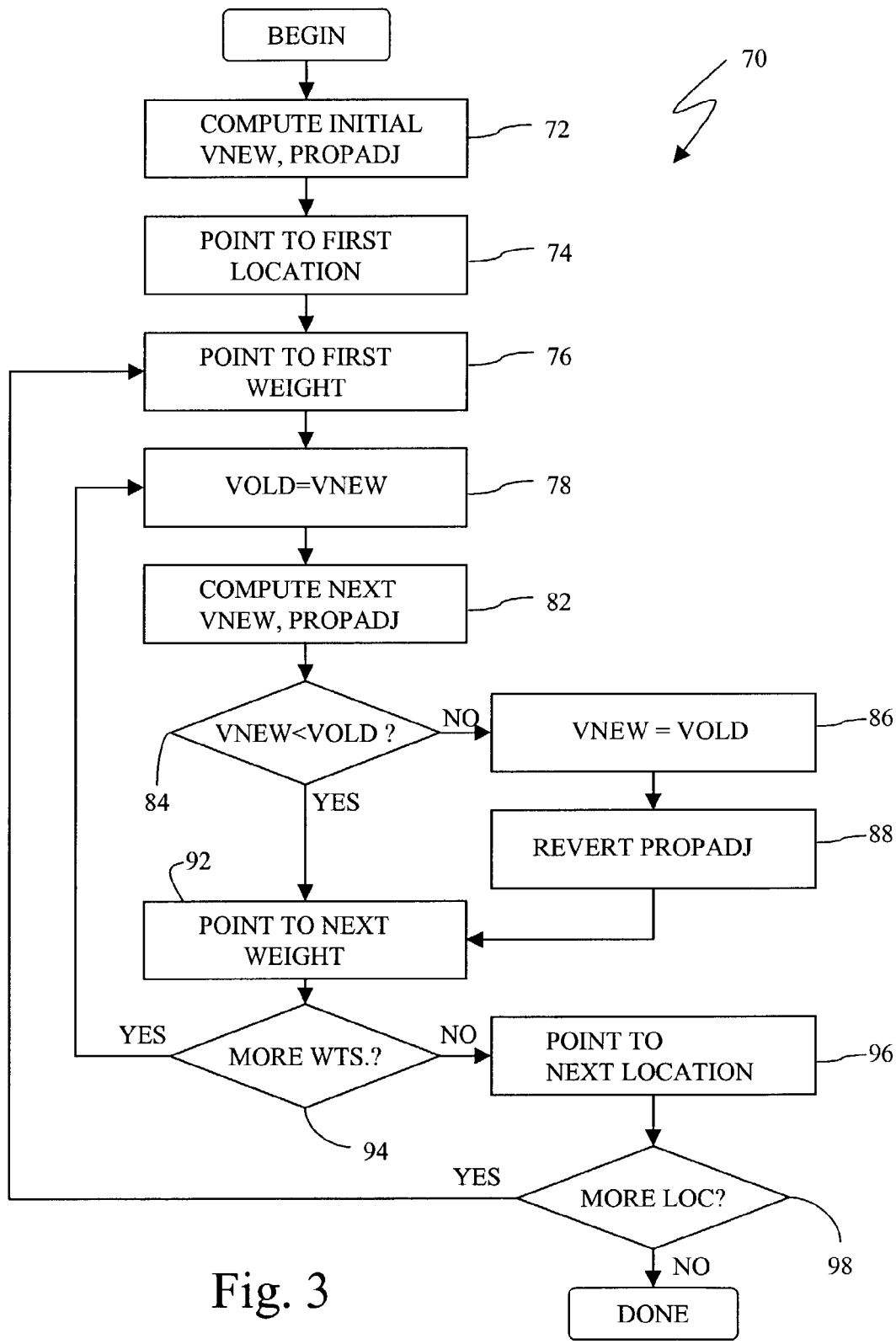
FIG. 3 is a flowchart illustrating steps performing in connection with an embodiment of the system described herein.

Referring to FIG. 3, a flow chart 70 illustrates steps performed in connection with the processing performed by the processor 32 to determine adjustments to reduce vibrations of the shaft 22. Processing begins at a first step 72 where initial vibration of the shaft is determined in accordance with the measurement performed by the accelerometer 26 and the tachometer 34. Note that the tachometer 34 provides phase information which is useful in determining the effect of adding weights to different locations at the end of the shaft 22. Computation/measurement of the vibration is discussed in more detail hereinafter.

Also upon initialization, the initial proposed adjustment (PROPADJ), corresponding to proposed values for the weights for adjustment, is set to correspond to the initial measured vibration. Thus, the initial value of PROPADJ is set either zero weight at each location or, in instances where weights have been added in connection with a prior adjustment, set to the current state of the weights.

Following the step 72 is a step 74 where a pointer that is used to keep track of the various locations at the end of the shaft (e.g., the locations illustrated in FIGS. 2A, 2B, and 2C) is made the point to the first of for the bolt hole locations in a list of all of the locations. The processing described herein iterates through all the locations to determine how much weight should be added to each of the locations.

Following the step 74 is a step 76 where another pointer is used to iterate through each of the possible weights (bolts and/or washers) that may be added to each of the locations. For example, if there are five different bolts of five different weights (and there are now washers), then the pointer used at the step 76 may point to, and iterate through, each of the five different weights. In effect, the processing of the flow chart 70 iterates through all of the locations and all of the possible weights that can be added to each of the locations.

Following the step 76 is a step 78 where a vibration calculated at a previous iteration, vold, is set equal to vibration calculated previously, vnew. At initialization, vnew is set to the vibration measured at the step 72 but, as described in more detail below, vnew is calculated for each iteration with a new weight and/or location. Following the step 78 is a step 82 where vnew is calculated using the location and weight according to the pointers initialized at the steps 74, 76 (and updated according to follow on steps described below). In addition, a new proposed adjustment, PROPADJ, is also determined based on the new values of the pointers.

Following the step 82 is a test step 84 where it is determined if vnew, the vibration calculated using the new weight at the location for the current iteration, is less than vold, the vibration calculated in connection with a previous iteration. If it is determined at the test step 84 that vnew is not less than vold, meaning that the weight provided at the current iteration do not improve the vibration situation, then control passes from the step 84 to a step 86 where vnew is set equal to vold, for processing in connection with the next iteration. Following the step 86 is a step 88 where PROPADJ is reverted to the previous value of PROPADJ. Thus, for example, if a six gram bolt was used in the previous iteration, and an eight gram bolt is used in the current iteration, and if it is determined that the eight gram bolt does not improve the vibration characteristics of the shaft 22, then the reversion at the step 88 sets the local optimal configuration to the six gram bolt.

Following the step 88, or following the step 84 if vnew is less than vold is a step 92 where the pointer used to keep track of the different weights is set to point to the next weight. Following the step 92 is a test step 94 where it is determined if all of the weights have been tried at the location being processed. If not, then control passes from the step 94 back up to the step 78 to iterate through using the next weight.

If it is determined that the test step 94 that all of the weights have been tried at the location being processed, then control passes from the step 94 to a step 96 where the pointer that points to the various locations is made to point to the next location. Note that the end result of calculating the vibration for all of the weights at a single location in the steps 78, 82, 84, 86, 88, 92 is to select a weight for a location that minimizes vibration characteristics.

Following the step 96 is a step 98 where it is determined if all of the locations have been processed. If not, control passes from the step 98 back up to the step 76 to process a next location. Otherwise, processing is complete. The end result is to have picked a weight (specific bolt and/or washer) for each location that minimizes vibration of the shaft 22, as indicated by PROPADJ. The result may be displayed to a user using, for example, the monitor 38. The user may then make the suggested adjustment and then rerun the machine to remeasure vibrations of the shaft 22.

Figure 4:
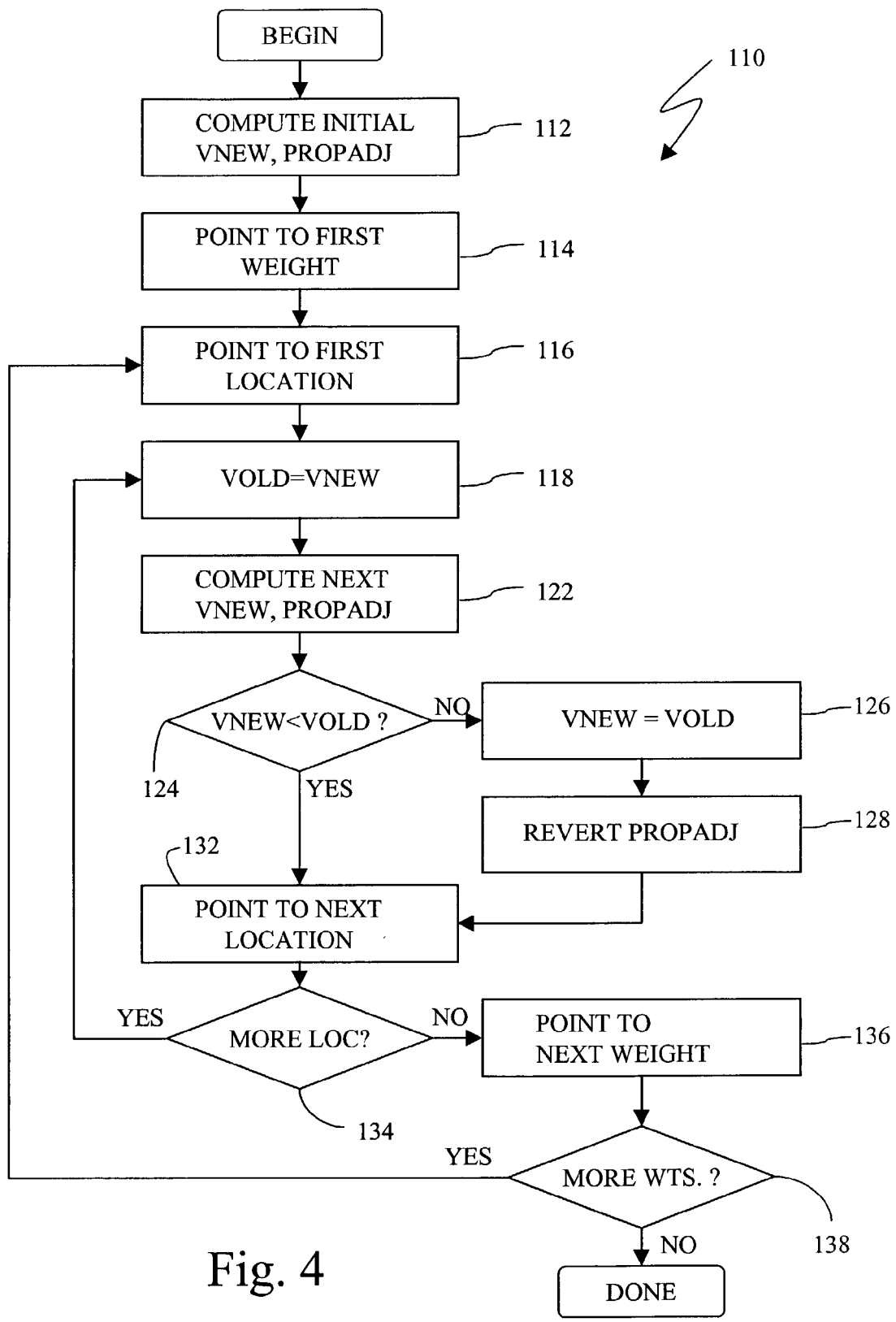
FIG. 4 is a flowchart illustrating steps performed in connection with an alternative embodiment of the system described herein.

Referring to FIG. 4, a flow chart 110 illustrates steps of an alternative embodiment performed in connection with the processing performed by the processor 32 to determine adjustments to reduce vibrations of the shaft 22. Processing begins at a first step 112 where initial vibration of the shaft is determined in accordance with the measurement performed by the accelerometer 26 and the tachometer 34. Note that the tachometer 34 provides phase information which is useful in determining the effect of adding weights to different locations at the end of the shaft 22. Computation of the vibration is discussed in more detail hereinafter.

Also upon initialization, the initial proposed adjustment (PROPADJ), corresponding to proposed values for the weights for adjustment, is set to correspond to the initial measured vibration. Thus, the initial value of PROPADJ is set either zero weight at each location or, in instances where weights have been added in connection with a prior adjustment, set to the current state of the weights.

Following the step 112 is a step 114 where a pointer is used to iterate through each of the possible weights (bolts and/or washers) that may be added to each of the locations. For example, if there are five different bolts of five different weights (and there are now washers), then the pointer used at the step 114 may point to, and iterate through, each of the five different weights.

Following the step 114 is a step 116 where another pointer that is used to keep track of the various locations at the end of the shaft (e.g., the locations illustrated in FIGS. 2A, 2B, and 2C) is made the point to the first of for the bolt hole locations in a list of all of the locations.

The processing illustrated by the flow chart 110 iterates through all the weights to determine how much weight should be added to each of the locations. A particular weight is tried at each location followed by the next weight at each location, etc. In contrast, the embodiment illustrated by the flow chart 70 iterates through each location by trying all the different weights at each location before processing another location.

Following the step 116 is a step 118 where a vibration calculated at a previous iteration, void, is set equal to vibration calculated previously, vnew. At initialization, vnew is set to the vibration measured at the step 112 but, as described in more detail below, vnew is calculated for each iteration with a new weight and/or location. Following the step 118 is a step 122 where vnew is calculated using the location and weight according to the pointers initialized at the steps 114, 116 (and updated according to follow on steps described below). In addition, a new proposed adjustment, PROPADJ, is also determined based on the new values of the pointers.

Following the step 122 is a test step 124 where it is determined if vnew, the vibration calculated using the new weight at the location for the current iteration, is less than void, the vibration calculated in connection with a previous iteration. If it is determined at the test step 124 that vnew is not less than void, meaning that the weight provided at the current iteration do not improve the vibration situation, then control passes from the step 124 to a step 126 where vnew is set equal to void, for processing in connection with the next iteration. Following the step 126 is a step 128 where PROPADJ is reverted to the previous value of PROPADJ. Thus, for example, if a six gram bolt was used in a previous iteration for the location, and an eight gram bolt is used in the current iteration, and if it is determined that the eight gram bolt does not improve the vibration characteristics of the shaft 22, then the reversion at the step 128 sets the local optimal configuration to the six gram bolt.

Following the step 128, or following the step 124 if vnew is less than vold is a step 132 where the pointer used to keep track of the different locations is set to point to the next location. Following the step 132 is a test step 134 where it is determined if all of the locations of the shaft 22 have been processed. If not, then control passes from the step 134 back up to the step 118 to iterate through using the next location.

If it is determined that the test step 134 that all of the locations have been processed, then control passes from the step 134 to a step 136 where the pointer that points to the various weights is made to point to the next weight (i.e. next bolt and/or washer combination).

Following the step 136 is a step 138 where it is determined if all of the possible weights have been processed. If not, control passes from the step 138 back up to the step 116 to process a next weight. Otherwise, processing is complete. The end result is to have picked a weight (specific bolt and/or washer) for each location that minimizes vibration of the shaft 22, as indicated by PROPADJ. The result may be displayed to a user using, for example, the monitor 38. The user may then make the suggested adjustment and then rerun the machine to remeasure vibrations of the shaft 22.

The measurement at the steps 72, 112 is performed using the sensed vibration signal from the accelerometer 26. In one embodiment, the signal is sampled approximately one hundred thousand times in a ten second period. The result of the sampling is then digitized, either by the conditioning electronics 28, the processor 32, a combination thereof, or some other appropriate mechanism. The digitized sampled signal values (in g's) are then converted into a value representing inches per second (ips) by multiplying the digitized sampled signal values value by 12/60 and by 32/2π. The resulting time domain signal is then converted into a frequency domain signal using a conventional FFT. Note, however, that it is possible for the shaft 22 to change rotation speeds during the sampling period, thus unduly complicating any resulting FFT's. Accordingly, prior to performing an FFT of the signal, a conventional spatial domain compensation is first performed to compensate the signal for any changes in rotation speed during the sampling period. The spatial domain compensation adjusts for any changes in rotation speed of the shaft 22 during the sampling period by interpolating data using the signal from the tachometer 34. Spatial domain compensation techniques are known in the art.

The result of performing the spatial domain compensation and the FFT is to provide a frequency domain vibration value, U, which is a complex number representing the magnitude and phase of the shaft vibration.

Computing new vibration values at the steps 82, 122 is performed using the equation:

$$V = U - X \cdot A$$

where V is the calculated vibration value (a complex number), U is the measured vibration, discussed above, A is the amount of the adjustment (a complex number based on the amount of weight and bolt hole position), and X an adjustment coefficient that is a scalar that represents the effect of weight on the vibration. The magnitude of the vibration, V, is determined in a conventional manner by taking the square root of the sum of the squares of the real and imaginary parts of the complex value V.

The value of X may be determined empirically by actually adding weights to the shaft 22 and then measuring the effects of the weight on vibration. That is, the vibration of the shaft is first measured and then a weight may be added to the shaft and the vibration measured again. From these two measurements, it is possible to solve for X. In some embodiments, it may be useful to take multiple measurements and select a value for X using, for example, some form of averaging. Note that X is in units of ips/gram. In some embodiments, X can be around 0.03 ips/gram, indicating that a weight change of one gram will affect ips by 0.03.

Note that the results of taking the FFT to provide the measured vibration signal, U, is expected to provide a single frequency component at the rotation frequency of the shaft 22. The presence of other significant frequency components (at, for example, twice the rotational speed of the shaft 22) is often an indication of mechanical failure that can not be cured with conventional shaft balancing. In some embodiments, the processor 32 will detect the presence of significant unexpected frequency components in the measured vibration signal and then, rather than propose an adjustment, will alert the user that shaft vibrations may be due to a mechanical failure. In some embodiments, a significant component is a component having a magnitude of at least 25% of a magnitude of the frequency component at the rotation frequency of the shaft 22.

Figure 5:
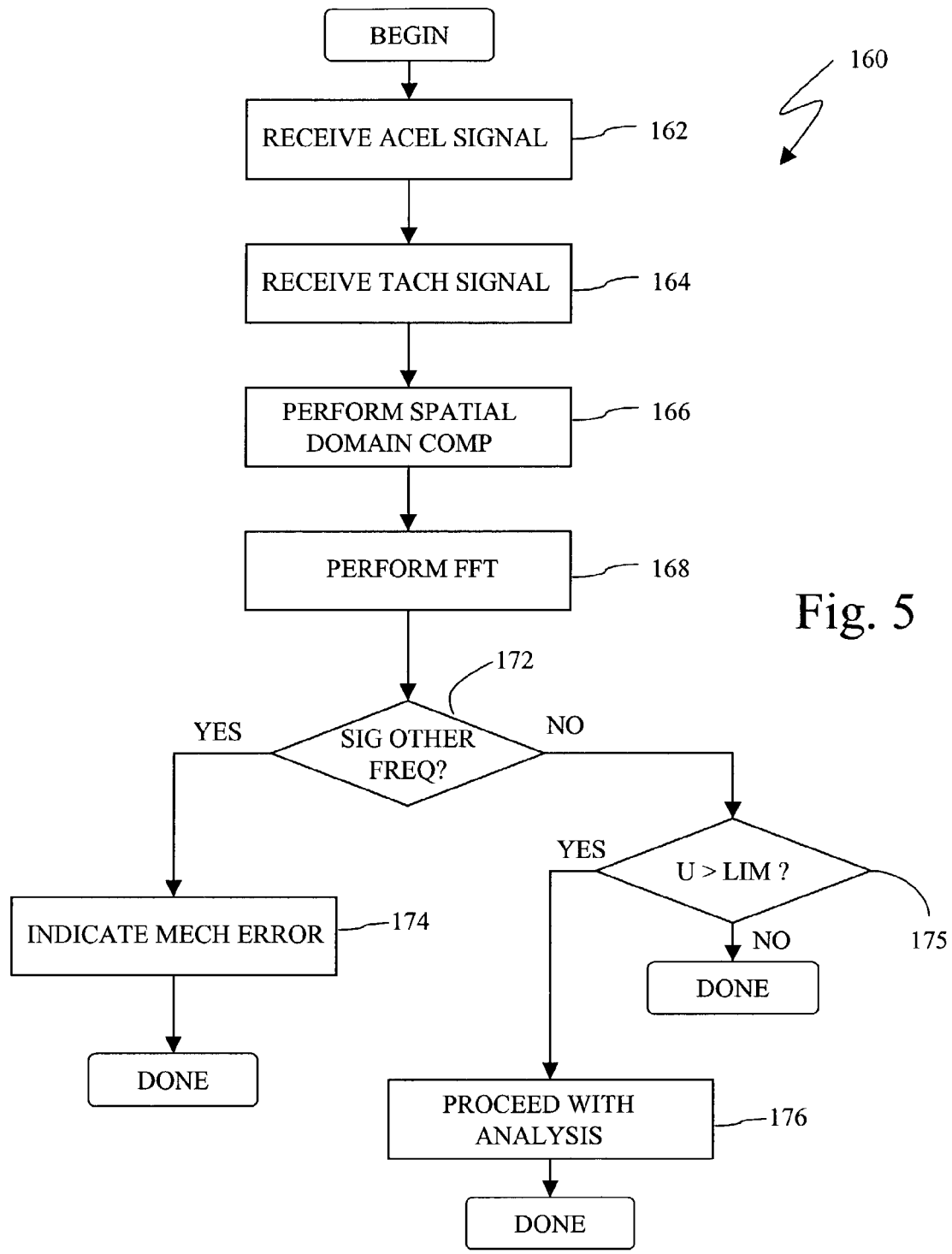
FIG. 5 is a flowchart illustrating steps performed in connection with signal acquisition according to the system described herein.

Referring to FIG. 5, a flowchart 160 illustrates steps performed in connection with signal acquisition. Processing begins at a first step 162 where a signal is received from the accelerometer 26. As discussed above, the signal received from accelerometer 26 corresponds to the vibration of the shaft 22.

Following the step 162 is a step 164 where a signal from the tachometer 34 is received. As discussed above, the signal from the tachometer 34 indicates the revolution speed of the shaft 22 as well as the phase of the shaft 22.

Following the step 154 is a step 166 where the spatial domain compensation, as discussed above, is performed on the signal received from the accelerometer 26. As discussed above, the signal received from the tachometer 34 is used in connection with the spatial domain compensation. Following step 166 is a step 168 where the FFT is performed to provide the frequency domain signal corresponding to the measured vibration.

Following the step 168 is a test step 172 where it is determined whether U, the frequency domain value representing the measured vibration signal, contains components of frequencies other than the rotational frequency of the shaft (other frequencies). If it is determined at the test step 172 that the measure vibration signal U contains significant other frequencies, then control passes from test step 172 to a step 174 when an error is indicated. e.g., by providing an appropriate display to the user at the monitor 38. As discussed above, the presence of significant other frequencies is often indicative of a mechanical failure of the shaft system which cannot be corrected using compensation weights. Following step 174, processing is complete.

If it is determined that the test step 172 that there are no significant other frequencies present, then control passes from the step 172 to a step 175, where it is determined if the magnitude of the measured vibration, U, is greater than a predetermined value, Limit. If not, then processing is complete; there are no adjustments to be made because the measured vibrations are below the predetermined value, Limit, which in some embodiments may be set to 0.01 ips. Otherwise, if it is determined at the step 175 that the magnitude of the measured vibration, U, is greater than the predetermined value, Limit, then control passes from the step 175 to a step 176 where the other analysis, such as that discussed above in connections with FIGS. 3 and 4, is performed to provide a proposed adjustment to a user.

Note that, although the analysis provided in connection with FIG. 3 and FIG. 4 determines proposed adjustments by minimizing vibrations, it is possible to use other criteria for selecting adjustments. In that case, the other criteria could be initially calculated at the steps 72, 112. New values for the criteria at each iteration could be calculated at the steps 82, 122. The test steps 84, 124 could calculate whether the criteria has improved at each iteration. The steps 88, 128 for reverting proposed adjustments could also revert the calculated criteria.

As an example of using alternative criteria, it is possible to select a shaft adjustment that minimizes the number of new weights added to the shaft while still maintaining the vibrations below a specific value, δ. In that case, the initial conditions (no new weights) may be set at the steps 72, 112. Then, for each iteration, the number of new weights may be determined at the steps 82, 122. At the test step, two tests may be performed: the first determines if VNEW<δ and the second determines if the number of new weights for the current iteration is less than the number of new weights for a previous iteration. Note that the steps 88, 128 could be used to revert the number of new weights to that of a previous iteration. Of course, there are other examples and other criteria that may be used in connection with the general processing illustrated in connection with FIG. 3 and FIG. 4 and described herein.

Note also that the general system described herein may be used with systems other than those containing rotating shafts. For instance, the system may be used in connection with balancing a propeller of a C-130. The system may also be used in connection with, and combined with, a system for balancing helicopter blades such as is disclosed in U.S. patent application Ser. No. 09/812,766 filed on Mar. 20, 2001 (Now U.S. Pat. No. 6,567,757) and/or U.S. patent application Ser. No. 09/846,731 filed on May 1, 2001 (Now U.S. Pat. No. 6,574,572), both of which are incorporated by reference herein.

While the invention has been disclosed in connection with various embodiments, modifications thereon will be readily apparent to those skilled in the art. Accordingly, the spirit and scope of the invention is set forth in the following claims.

What is claimed is:

1. A method of determining a proposed adjustment of a mechanical component, comprising:
   measuring an initial vibration of the component;
   determining if the initial vibration is greater than a predetermined value; and
   if the initial vibration is greater than the predetermined value, determining an adjustment by choosing a best adjustment for each possible location for adjustments, wherein the adjustments are provided by discrete weights placed at possible locations for adjustments and wherein the best adjustment is determined by iterating through different combinations of weights at different locations and determining a particular combination of specific weights at specific locations that provides a better result than other combinations of specific weights at specific locations.

2. A method, according to claim 1, wherein choosing the best adjustment includes choosing an adjustment that causes a lower amount of vibration than adjustments not chosen.

3. A method, according to claim 1, wherein choosing the best adjustment includes choosing an adjustment that reduces the vibration to an acceptable level and minimizes the number of weights that are added.

4. A method, according to claim 1, wherein measuring an initial vibration includes using an accelerometer.

5. A method, according to claim 4, wherein measuring an initial vibration includes using conditioning electronics in connection with the accelerometer.

6. A method, according to claim 1, wherein the predetermined value is 0.01 ips.

7. A method of determining a proposed adjustment of a mechanical component, comprising:
   measuring an initial vibration of the component:
   determining if the initial vibration is greater than a predetermined value;
   if the initial vibration is greater than the predetermined value, determining an adjustment by choosing a best adjustment for each possible location for adjustments; and
   following measuring an initial vibration of the component, indicating a mechanical fault in response to the initial vibration containing a significant frequency component other than a frequency component at a rotation rate of the component, wherein a significant component corresponds to a magnitude of at least 25% of a magnitude of the frequency component at the rotation rate of the component.

8. A method of determining a proposed adjustment of a mechanical component, comprising:
   measuring an initial vibration of the component;
   determining if the initial vibration is greater than a predetermined value; and
   if the initial vibration is greater than the predetermined value, determining an adjustment by choosing a best adjustment for each possible location for adjustments,
   wherein determining an adjustment includes:
      setting an initial proposed adjustment;
      setting a first pointer to point to a first location;
      setting a second pointer to point to a first weight;
      iterating the second pointer through each of the weights and updating the proposed adjustment when a new weight causes a decrease in calculated vibrations; and iterating the first pointer through each of the locations and performing the iteration of the second pointer at each location.

9. A method of determining a proposed adjustment of a mechanical component, comprising:
   measuring an initial vibration of the component;
   determining if the initial vibration is greater than a predetermined value; and
   if the initial vibration is greater than the predetermined value, determining an adjustment by choosing a best adjustment for each possible location for adjustments, wherein determining an adjustment includes:
      setting an initial proposed adjustment;
      setting a first pointer to point to a first weight;
      setting a second pointer to point to a first location;
      iterating the second pointer through each of the location and updating the proposed adjustment when a new weight causes a decrease in calculated vibrations; and
      iterating the first pointer through each of the weights and performing the iteration of the second pointer for each weight.

10. A method of determining a proposed adjustment of a mechanical component, comprising:
    measuring an initial vibration of the component;
    determining if the initial vibration is greater than a predetermined value; and
    if the initial vibration is greater than the predetermined value, determining an adjustment by choosing a best adjustment for each possible location for adjustments, wherein the mechanical component is a shaft and wherein all of the possible locations for an adjustment are symmetrical about a circumference at an end of the shaft and wherein all of the possible locations for an adjustment are at a constant radius about a circumference at an end of the shaft.

11. A method of determining a proposed adjustment of a mechanical component, comprising:
    measuring an initial vibration of the component;
    determining if the initial vibration is greater than a predetermined value; and
    if the initial vibration is greater than the predetermined value, determining an adjustment by choosing a best adjustment for each possible location for adjustments, wherein the mechanical component is a shaft and wherein all of the possible locations for an adjustment are symmetrical about a circumference at an end of the shaft and wherein a first set of the possible locations for an adjustment are at a first radius about a circumference at an end of the shaft and wherein a second set of the possible locations for an adjustment are at a second radius about a circumference at an end of the shaft.

12. A method of determining a proposed adjustment of a mechanical component, comprising:
    measuring an initial vibration of the component;
    determining if the initial vibration is greater than a predetermined value; and
    if the initial vibration is greater than the predetermined value, determining an adjustment by choosing a best adjustment for each possible location for adjustments, wherein the mechanical component is a shaft and wherein all of the possible locations for an adjustment are non-symmetrical about a circumference at an end of the shaft and wherein the best adjustment is determined by iterating through different combinations of weights at different locations and determining a particular combination of specific weights at specific locations that provides a better result than other combinations of specific weights at specific locations.

13. Computer software that determines a balance adjustment for a mechanical component, comprising:
    executable code that measures an initial vibration of the component;
    executable code that determines if the initial vibration is greater than a predetermined value; and
    executable code that, if the initial vibration is greater than the predetermined value, determines an adjustment by choosing a best adjustment for each possible location for adjustments.

14. Computer software, according to claim 13, further comprising:
    executable code that chooses an adjustment that causes a lower amount of vibration than adjustments not chosen.

15. Computer software, according to claim 13, further comprising:
    executable code that chooses an adjustment that causes an amount of vibration below a predetermined amount and minimizes a number of new weights that are added.

16. Computer software, according to claim 13, further comprising:
    executable code that, following measuring an initial vibration of the component, indicates a mechanical fault in response to the initial vibration containing a significant frequency component other than a frequency component at a rotation rate of the component.

17. Computer software, according to claim 16, wherein a significant component corresponds to a magnitude of at least 25% of a magnitude of the frequency component at the rotation rate of the component.

18. Computer software, according to claim 13, further comprising:
    executable code that sets an initial proposed adjustment;
    executable code that sets a first pointer to point to a first location;
    executable code that sets a second pointer to point to a first weight;
    executable code that iterates the second pointer through each of the weights and updates the proposed adjustment when a new weight causes a decrease in calculated vibrations; and
    executable code that iterates the first pointer through each of the locations and performs the iteration of the second pointer at each location.

19. Computer software, according to claim 13, further comprising:
    executable code that sets an initial proposed adjustment;
    executable code that sets a first pointer to point to a first weight;
    executable code that sets a second pointer to point to a first location;
    executable code that iterates the second pointer through each of the location and updates the proposed adjustment when a new weight causes a decrease in calculated vibrations; and
    executable code that iterates the first pointer through each of the weights and performs the iteration of the second pointer for each weight.

20. A system that determines adjustments for a mechanical component, comprising:
    means for measuring an initial vibration of the component;
    means for determining if the initial vibration is greater than a predetermined value; and means for determining an adjustment by choosing a best adjustment for each possible location for adjustments if the initial vibration is greater than the predetermined value, wherein the adjustments are provided by discrete weights placed at possible locations for adjustments and wherein the best adjustment is determined by iterating through different combinations of weights at different locations and determining a particular combination of specific weights at specific locations that provides a better result than other combinations of specific weights at specific locations.

21. A system, according to claim 20, wherein means for measuring includes an accelerometer.

22. A system, according to claim 21, wherein means for measuring further includes conditioning electronics coupled to the accelerometer.

* * * * *